Figure 1:
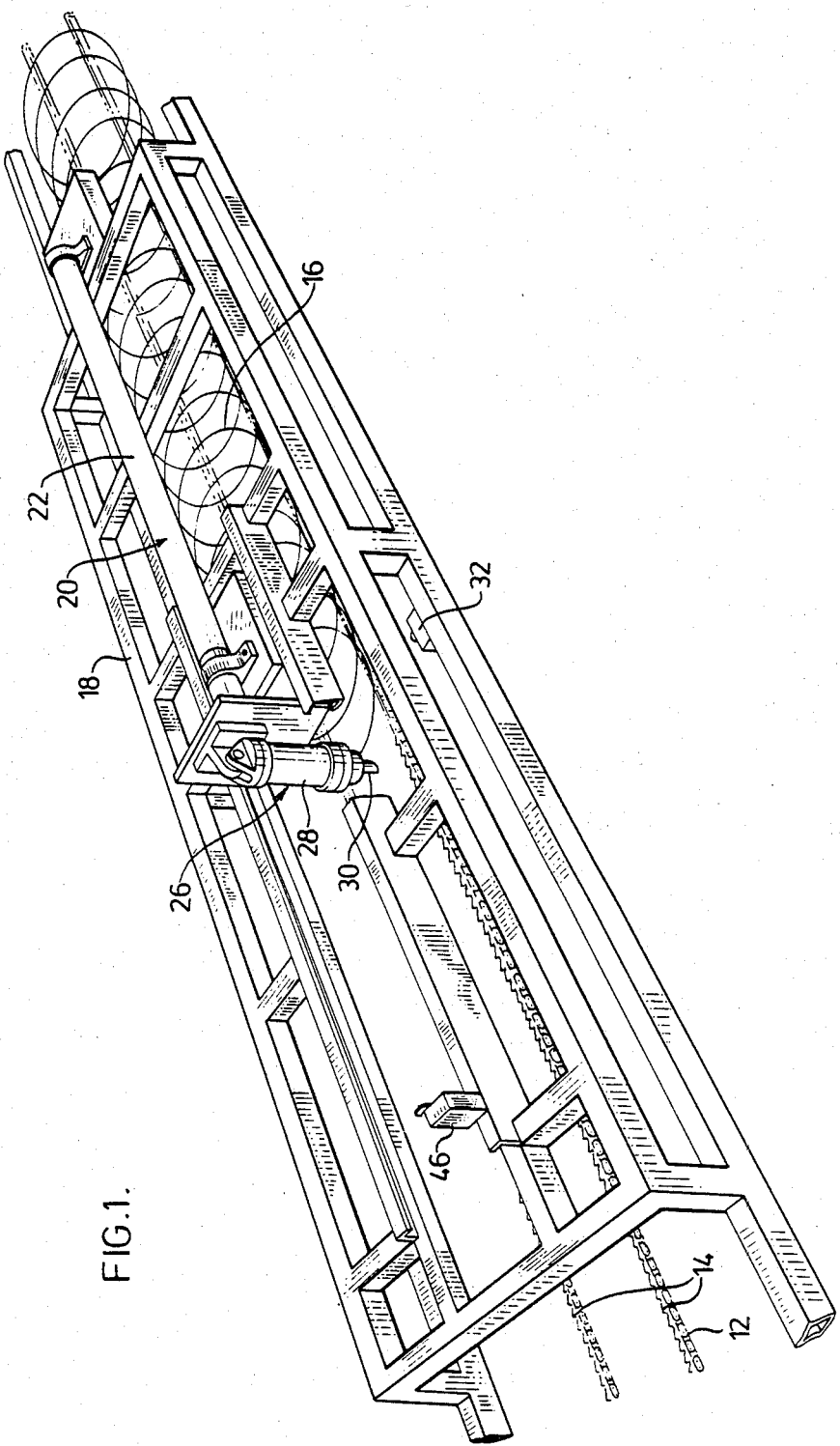

United States Patent [19]

Kamping et al.

[11] Patent Number: 4,498,505
[45] Date of Patent: Feb. 12, 1985

[54] APPARATUS FOR SEPARATING A COIL FROM FOLLOWING COILS OF COILED WIRE ROD

[76] Inventors: Jan H. Kamping, 1804-2160 Lakeshore Rd.; Elmer R. Bridge, both of Burlington, Canada

[21] Appl. No.: 506,556

[22] Filed: Jun. 21, 1983

[51] Int. Cl.³ .............................................. B26D 7/14
[52] U.S. Cl. .......................................... 140/2; 83/175; 83/907
[58] Field of Search ...................... 140/2; 83/175, 907, 83/176; 72/131, 203; 242/79

[56] References Cited

U.S. PATENT DOCUMENTS

| | | | |
|---|---|---|---|
| 3,756,289 | 9/1973 | Rotert et al. | 140/2 |
| 4,064,916 | 12/1977 | Dahmen | 140/2 |
| 4,088,160 | 5/1978 | Balmat et al. | 140/2 |
| 4,154,269 | 5/1979 | Massahiko et al. | 140/2 |

Primary Examiner—Donald R. Schran
Attorney, Agent, or Firm—Robert F. Delbridge; Arne I. Fors

[57] ABSTRACT

Apparatus for separating coils of coiled wire rod from following coils travelling along a moving conveyor includes a coil engaging device mounted above the conveyor. The coil engaging device is advanced in the same direction as the conveyor from a first position to a second position at a speed greater than that of the conveyor and is moved downwardly to engage a selected coil at the first position to cause the selected coil to be moved ahead relative to following coils by the advancing movement of the coil engaging device.

6 Claims, 3 Drawing Figures

APPARATUS FOR SEPARATING A COIL FROM FOLLOWING COILS OF COILED WIRE ROD

This invention relates to apparatus for separating a coil of coiled wire rod from succesive coils travelling along a moving conveyor to enable the separated coil to be cut from the following coils.

Wire rod is conventionally manufactured from a billet which is heated and shaped in a wire rolling mill from which hot wire rod emerges at high speed, for example of the order of 15,000 ft/min (5,000 meters/min). The hot wire rod passes through a coiling device and the resultant coils are made in a flat overlapping manner on a horizontal travelling conveyor for passage through a cooling section, after which the flat overlapping coils are oriented to a conventional coil.

At such high production speeds, each of the billets is used up in a relatively short time, for example a billet weighing 1600-2000 pounds (700-900 kgs) is used up in about one minute. There is consequently a break in wire production as a fresh billet is supplied to the wire rolling mill with the result that the leading end coils, for example the first four or five coils of wire rod produced from the fresh billet are for various reasons unsatisfactory, for example because of irregularities in cross-sectional shape and/or temperature treatment. It is thus necessary for the unsuitable leading end coils to be removed from the remaining following coils in order to produce a satisfactory run of coiled rod. Once removed, the unsatisfactory leading end coils are usually recycled.

Various proposals have been made for removing the unsuitable leading end coils. However, such removal presents problems in view of the high speed of production, the overlapping of the coils on the conveyor, and the necessity for the configuration of the coils not to be unduly distorted while cooling.

It is thus an object of the invention to provide improved apparatus for separating a coil of coiled wire rod from successive or following coils travelling along a moving conveyor.

According to the invention, apparatus comprises a coil engaging device mounted above the conveyor, means for advancing the coil engaging device in the same direction as the conveyor from a first position to a second position at a speed greater than that of the conveyor and for returning the coil engaging device to the first position and means for moving the coil engaging device downwardly to engage a selected coil at the first position to cause the selected coil to be moved ahead relative to following coils by said advancing movement of the coil engaging device and for moving the coil engaging device upwardly to disengage from the coil at the second position.

Thus, a coil is moved ahead of successive coils and can then be readily cut from the successive coils by a manually or automatically operated cutting device. Further, since most conveyors have coil retaining devices such as teeth to retain the coils in the position in which they are placed, the separated coil will remain in the advanced position in which it has been placed by advancement of the coil engaging device after the coil negating device has been disengaged. Thus, the separated coil can be cut from the successive or following coils at any convenient subsequent position along the conveyor.

The apparatus may also include means responsive to the arrival of an initial leading end coil at a predetermined position along the conveyor to initiate said downward movement and advancing movement of the coil engaging device. The arrival responsive means may comprise an electrical sensor means operated by said initial leading end upon arrival at said predetermined position and adjustable electrical time means operable to initiate said downward movement and advancing movement of the coil engaging device and adjustable predetermined time after operation of said electrical sensor means and cause the coil engaging device to engage a coil which lies an adjustable predetermined number of coils behind said initial leading coil.

The apparatus may also include limit switch means responsive to arrival of the coil engaging device at the second position to initiate the upward movement and return movement of the coil engaging device. The means for advancing and returning the coil engaging device may comprise a fluid-pressure-operated piston and cylinder means and the means for moving the coil engaging device downwardly and upwardly may also comprise a fluid-pressure-operated piston and cylinder device.

Figure 2:
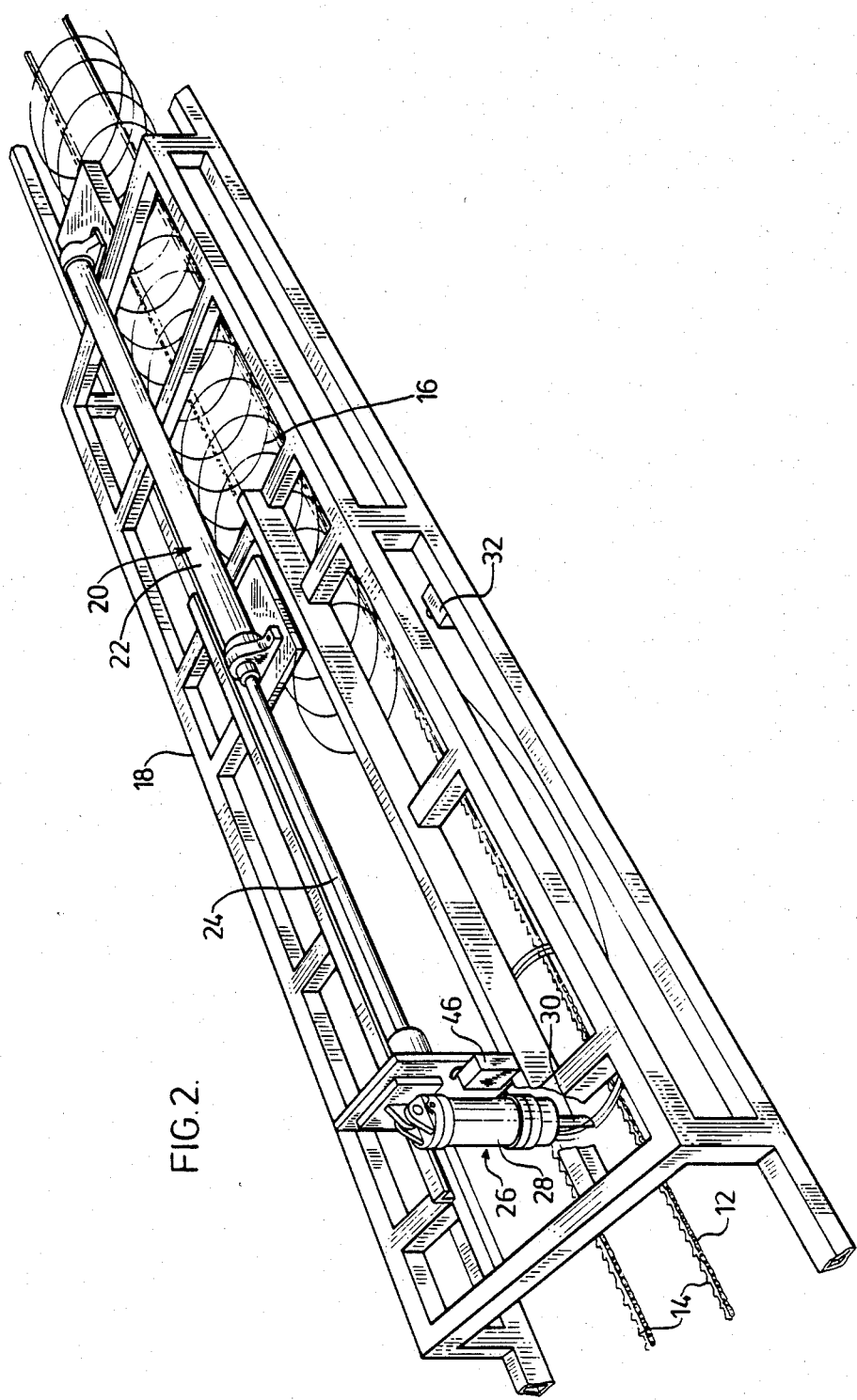
Figure 3:
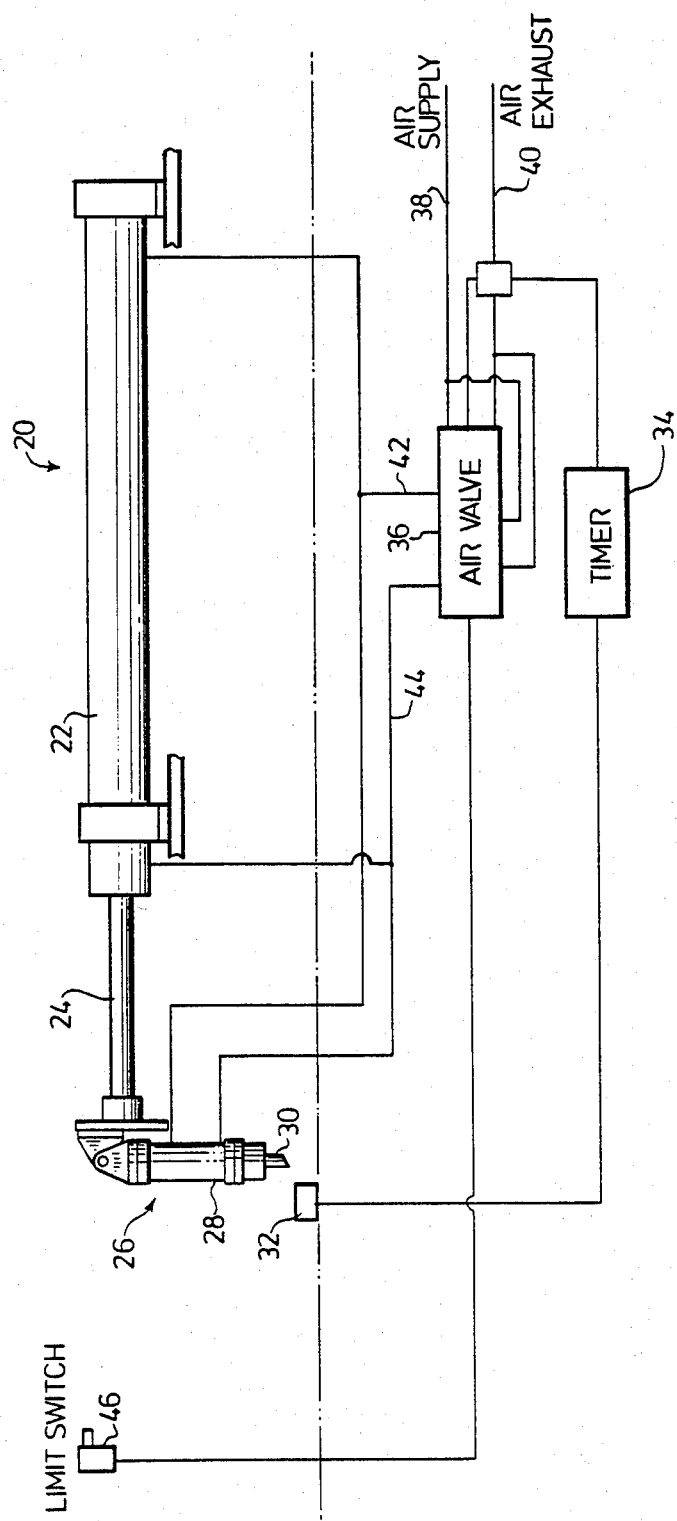

One embodiment of the invention will now be described, by way of example, with reference to the accompanying drawings, in which:

FIG. 1 is a perspective view of a coiled wire rod conveyor to which one embodiment of the invention has been fitted, the figure showing the positions of the fluid-pressure-operated components before arrival of a leading end coil, the fluid-pressure connections being omitted for clarity, FIG. 2 is a similar view showing the positions of the fluid-pressure-operated components after actuation by the leading end coil, and FIG. 3 is a block diagram showing the fluid-pressure connections between the various components.

Referring to the drawings, a wire rod chain conveyor 12 has teeth 14 on opposite sides for retaining wire rod coils 16 in position on the conveyor. Typically, such a conveyor may be about 120 ft (35 m) long and be travelling at about 60-120 ft/min (about 20-40 meters/min), and the wire rod may range in diameter from about 0.2 to about 0.5 inch (0.5 to 1.25 cms). In FIGS. 1 and 2, the conveyor 12 is moving from left to right.

In accordance with this embodiment of the invention, a frame 18 is mounted on a suitable portion of the conveyor. A relatively long double-acting air-operated piston and cylinder device 20 has its cylinder 22 secured to the frame 18 above the conveyor 12 so that the cylinder 22 extends in the direction of the conveyor 12 with the piston rod 24 projecting from the leading end. The piston and cylinder device 20 has a stroke of about 6 ft (2 meters). A relatively short-acting air-operated piston and cylinder device 26 has its cylinder 28 secured to the projecting end of the piston rod 24 so that it extends vertically with its piston 30 projecting downwardly.

An electrical coil sensor 32 in the form of a limit switch is mounted on the frame 18 and is located in the path of the wire rod coil 16 below the front end of the cylinder 22, the sensor 32 being connected to an adjustable electrical timer 34. The timer 34 is connected to an air valve 36 with an air pressure supply 38 and air exhaust 40. A line 42 extends from the valve 36 to the extending end of the cylinders 22, 28, and a line 34 extends from the valve 36 to the contracting end of the cylinders 22, 28. An electrical limit switch 46 is mounted on the frame 18 and located in the path of the cylinder 28 at the position reached when the piston 24 is fully extended, the limit switch 46 being connected to the air valve 36.

Initially, both pistons 24 and 30 are in the fully contracted positions as shown in FIG. 1. When the initial coil of a new series of coils 16 reaches the coil sensor 32, it engages and actuates the sensor 32 to cause actuation of the adjustable timer 36. The timer 36 is adjusted so that, after a predetermined time corresponding to the passage of a predetermined number (for example from 2 to 5) of coil 16 passed the sensor 32, the air valve 36 is actuated to pressurize line 42, with line 44 being connected to exhaust. Piston 30 is consequently extended in a vertically downward direction to extend below the level of the coils 16, and piston 24 is extended to move the extended piston 30 along a conveyor 12 at a speed greater than (for example about twice) the speed of the conveyor 12. Thus, piston 30 engages the coil 16 immediately in front and advances the predetermined number of leading end coils relatively to the following coils 16.

The advanced coils 16 are then held in relatively advanced position by the teeth 14 as shown in FIG. 2, can be cut from a successive coil 16 by manual or automatic means at any convenient location along the conveyor 12.

When the piston rod 24 is fully extended, the cylinder 28 engages the limit switch 46 which causes the air valve 36 to reverse the air connections to the cylinder 22, 28. The piston rods 24, 30 are therefore retracted to the position shown in FIG. 1. If desired, the piston and cylinder device 26 may be capable of pivoting movement on the piston rod 24 on its return stroke to ensure that the piston rod 30 does not affect forward movement of coils 16 as it returns to the starting position. When the last coil 16 has passed the sensor 32, the timer 34 is automatically reset to await arrival of the leading end coils from the next billet.

The advantages of the invention will be readily apparent to a person skilled in the art from the above description of a preferred embodiment. The timer 32 may readily be adjusted so that the number of leading end coils separated may be varied as desired.

It will also be readily apparent that the invention is also applicable to separating any coil or coils from successive or following coils, and is also applicable to the separation of a coil or coils from the final coils of a run of coiled wire rod so that the final coils can be cut off and discarded if desired.

Still further embodiments of the invention will be apparent to a person skilled in the art, the scope of the invention being defined in the appended claims.

What we claim as new and desire to protect by Letters Patent of the United States is:

1. Apparatus for separating coils of coiled wire rod from following coils travelling along a moving conveyor comprising a coil engaging device mounted above the conveyor, means for advancing the coil engaging device in the same direction as the conveyor from a first position to a second position at a speed greater than that of the conveyor and for returning the coil engaging device to the first position and means for moving the coil engaging device downwardly to engage a selected coil at the first position to cause the selected coil to be moved ahead relative to following coils by said advancing movement of the coil engaging device and for moving the coil engaging device upwardly to disengage from the coil at the second position.

2. Apparatus according to claim 1 including means responsive to the arrival of an initial leading end coil at a predetermined position along the conveyor to initiate said downward movement and advancing movement of the coil engaging device.

3. Apparatus according to claim 2 wherein said arrival responsive means comprises an electrical sensor means operated by said initial leading end upon arrival at said predetermined position and adjustable electrical timer means operable to initiate said downward movement and advancing movement of the coil engaging device and adjustable predetermined time after operation of said electrical sensor means and cause the coil engaging device to engage a coil which lies an adjustable predetermined number of coils behind said initial leading coil.

4. Apparatus according to claim 1 including limit switch means responsive to arrival of the coil engaging device at the second position to initiate the upward movement and return movement of the coil engaging device.

5. Apparatus according to claim 1 wherein said means for advancing and returning the coil engaging device comprises fluid-pressure-operated piston and cylinder means.

6. Apparatus according to claim 1 wherein said means for moving said coil engaging device downwardly and upwardly comprises a fluid-pressure-operated piston and cylinder device.

* * * * *